United States Patent
Shiu et al.

(10) Patent No.: US 9,232,605 B2
(45) Date of Patent: Jan. 5, 2016

(54) LOAD DRIVING CIRCUIT WITH CHARGE SPIKE PROTECTION

(75) Inventors: Shian-Sung Shiu, New Taipei (TW); Chia-Ming Chan, New Taipei (TW)

(73) Assignee: GREEN SOLUTION TECHNOLOGY CO., LTD., New Taipei (TW)

( * ) Notice: Subject to any disclaimer, the term of this patent is extended or adjusted under 35 U.S.C. 154(b) by 989 days.

(21) Appl. No.: 13/360,077

(22) Filed: Jan. 27, 2012

(65) Prior Publication Data
US 2013/0043798 A1 Feb. 21, 2013

(30) Foreign Application Priority Data

Aug. 19, 2011 (TW) .............................. 100129806 A

(51) Int. Cl.
H05B 39/00 (2006.01)
H05B 33/08 (2006.01)

(52) U.S. Cl.
CPC ............. H05B 33/089 (2013.01); *Y02B 20/341* (2013.01)

(58) Field of Classification Search
CPC .. H05B 33/089; H05B 41/2325; H05B 41/46; H05B 37/036; H05B 39/105; H01F 38/10
USPC ......... 315/187, 121, 125, 307, 186, 122, 246; 323/282, 271, 234, 285; 327/378–385
See application file for complete search history.

(56) References Cited

U.S. PATENT DOCUMENTS

| 5,519,557 A | * | 5/1996 | Kopera et al. | .................... 361/84 |
| 6,507,471 B2 | * | 1/2003 | Colclaser et al. | ............. 361/111 |
| 2009/0121656 A1 | * | 5/2009 | Mazzochette | ................. 315/312 |
| 2009/0302776 A1 | * | 12/2009 | Szczeszynski | ................ 315/246 |

* cited by examiner

*Primary Examiner* — Lincoln Donovan
*Assistant Examiner* — Thomas Skibinski
(74) *Attorney, Agent, or Firm* — Muncy, Geissler, Olds & Lowe P.C.

(57) ABSTRACT

A load driving circuit comprises a converting circuit, a converting controller, a load driving modulator, and a charge spike protection circuit. The converting circuit is adapted to be coupled to an output power source and supplies a driving power source to drive a load. The converting circuit has an output capacitance coupled to an output end thereof. The converting controller controls an amount of the driving power source responsive to a current or a voltage of the load. The load driving modulator and the load, connected in series, are coupled to the output end and so the load driving modulator adjusts an electronic state of the load. The charge spike protection circuit is coupled to the output capacitance and at least one connecting node of the load and the load driving modulator to provide a unidirectional charge release path to the output capacitance.

6 Claims, 2 Drawing Sheets

LOAD DRIVING CIRCUIT WITH CHARGE SPIKE PROTECTION

BACKGROUND

1. Field of the Invention

The present invention relates to a load driving circuit with charge spike protection, and more particularly relates to a load driving circuit using a capacitance to function the charge spike protection.

2. Description of Related Art

FIG. 1 is a schematic diagram of a conventional LED driving circuit. The LED driving circuit comprises a converting controller 100, a boost converting circuit 160, an output capacitance C, an LED module 150, a lowest voltage selecting circuit 140, and a current balance circuit 145. The boost converting circuit 160 is a direct current to direct current boost converting circuit, comprising an inductance L, a switch SW and a rectifier device D. One end of the inductance L is coupled to an input power source Vin and the other end thereof is coupled to one end of the switch SW. Another end of the switch SW is grounded. A positive end of the rectifier device D is coupled to the connecting node of the inductance L and the switch SW and a negative end thereof is coupled to the output capacitance C. The output capacitance C receives the power transmitted by the boost converting circuit 160 to generate a driving power source Vout to drive the LED module 150 lighting.

The current balance circuit 145 is coupled to every negative end of the LED string in the LED module 150 to balance the currents of the LED strings. Therefore, every LED string lights equally. The lowest voltage selecting circuit 140 is coupled to every negative end of the LED string in the LED module 150 to determine whose voltage is the lowest and accordingly generates a voltage feedback signal VFB. The converting controller 100 generates a switching signal Sc according to the voltage feedback signal VFB to control the switch SW.

The converting controller 100 is packaged in a package structure comprising a drive pin and a ground pin. Therefore, an electrostatic discharge protection circuit is equipped in the converting controller 100 to transmit the electrostatic energy out by the two pins to avoid the converting controller 100 damaged. The current balance circuit 145 has no drive pin (VDD pin) and so it does not have the electrostatic discharge protection circuit for the VDD pin. Therefore, while the electrostatic energy is transmitted into the current balance circuit 145 by the connecting node of the current balance circuit 145 and the LED module 150, the current balance circuit 145 is easily to be damage due to the electrostatic energy.

FIG. 2 is a schematic diagram of a conventional LED driving circuit with electrostatic discharge protection circuit. Compared with FIG. 1, the circuit in FIG. 2 additionally increases a TVS electrostatic discharge protection circuit 155 which is coupled to the ground and the connecting node of the current balance circuit 145 and the LED module 150. The TVS electrostatic discharge protection circuit 155 is composed by the transient voltage suppressor (TVS). A feature of the TVS is to respond faster and so the TVB protects electronic devises from a transient energy before the electronic devises are damaged. Another feature thereof is lower breakdown voltage and so the TVB is applicable to a low-voltage application. When the electrostatic discharge is produced, no matter it is a positive voltage or negative voltage, it can be transmitted to the ground by the TVS in the TVS electrostatic discharge protection circuit 155 to function the electrostatic discharge protection.

At the same time, a cost of the TVB is high, and total cost of system is substantially increased. Moreover, a tolerance of breakdown voltage of the TVB is large. It results that users may use the TVB with a breakdown voltage much higher than a driving voltage to avoid the TVB conducting in a normal voltage range of the driving voltage. Therefore, the breakdown voltage of the TVB may be close to a withstanding voltage of the current balance circuit 145 and so the current balance circuit 145 may temporarily be pressed with a voltage higher than the withstanding voltage. The life spin of the current balance circuit 145 may be shortened. As a result, the circuit needing ESD protection is not equipped with the ESD protection circuit due to the reasons mentioned above and the circuit without ESD protection circuit has lower reliability and can not pass ESD association standards.

SUMMARY

In view of that the transient voltage suppressor applied in the LED driving circuit has the shortcoming mentioned above, the present invention increases an electrostatic discharge protection circuit between a capacitance of the converting circuit and a pin of the chip without electrostatic discharge protection circuit. It can reach the electrostatic discharge protection function for the chip by an energy storing function of the capacitance and further extend the life spin of the chip.

To accomplish the aforementioned and other objects, an exemplary embodiment of the invention provides a load driving circuit with charge spike protection, comprising a converting circuit, a converting controller, a load driving modulator and a charge spike protection circuit. The converting circuit is adapted to be coupled to an input power source and supply a driving power source at an output end to drive a load. Wherein the converting circuit has an output capacitance coupled to an output end thereof. The converting controller controls an amount of the driving power source responsive to a current or a voltage of the load. The load driving modulator and the load, connected in series, are coupled to the output end of the converting circuit and so the load driving modulator adjusts an electronic state of the load. The charge spike protection circuit is coupled to the output capacitance and at least one connecting node of the load and the load driving modulator to provide an unidirectional charge release path to the output capacitance.

The invention provides another load driving circuit with charge spike protection, comprising a converting circuit, a converting controller, a load driving modulator and a charge spike protection circuit. The converting circuit is adapted to be coupled to an input power source and supply a driving power source at an output end to drive a load. Wherein the converting circuit has an output capacitance coupled to an output end thereof. The converting controller controls an amount of the driving power source responsive to a voltage of the driving power source. The load driving modulator and the load, connected in series, are coupled to the output end of the converting circuit and so the load driving modulator adjusts an electronic state of the load. The charge spike protection circuit is coupled to the output capacitance and at least one connecting node of the load and the load driving modulator to provide an unidirectional charge release path to the output capacitance.

It is to be understood that both the foregoing general description and the following detailed description are exemplary, and are intended to provide further explanation of the invention as claimed. In order to make the features and the advantages of the invention comprehensible, exemplary embodiments accompanied with figures are described in detail below.

BRIEF DESCRIPTION OF THE DRAWINGS

The present invention will now be specified with reference to its preferred embodiment illustrated in the drawings, in which.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
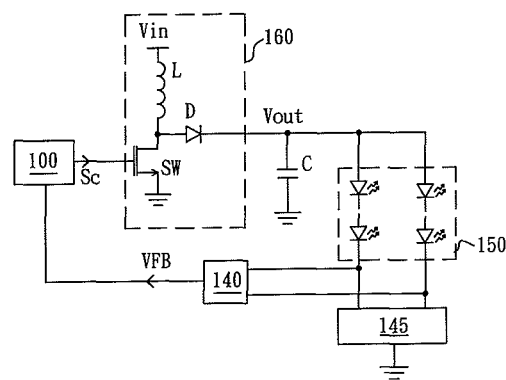
FIG. 1 is a schematic diagram of a conventional LED driving circuit.
Figure 2:
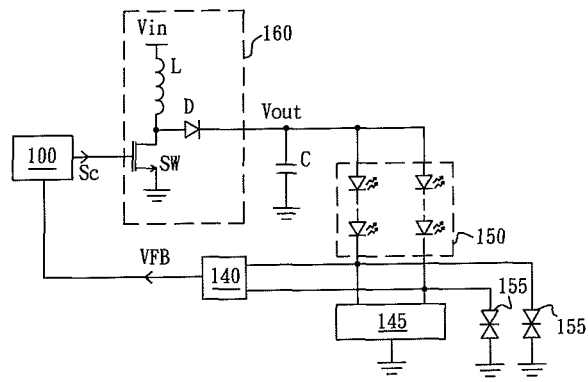
FIG. 2 is a schematic diagram of a conventional LED driving circuit with electrostatic discharge protection circuit.
Figure 3:
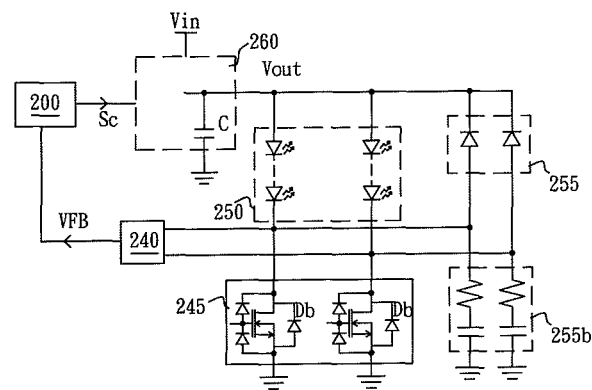
FIG. 3 is a schematic diagram of a load driving circuit with charge spike protection according to a first embodiment of the invention.

FIG. 3 is a schematic diagram of a load driving circuit with charge spike protection according to a first embodiment of the invention. A load driving circuit comprises a converting circuit 260, a converting controller 200, a load driving modulator 245 and a charge spike protection circuit 255. The converting circuit 260 is adapted to be coupled to an input power source Vin and supply a driving power source Vout at an output end to drive a load 250. The converting circuit 260 has an output capacitance C coupled to an output end thereof. The converting circuit 260 is a conventional direct current to direct current converting circuit, such as boost converter, buck converter, a flyback converter, a forward converter and a LLC resonant converter. The converting controller 200 generates a switch signal Sc responsive to a voltage of the load 250 to control an amount of the driving power source Vout. The load driving modulator 245 and the load, connected in series, are coupled between the output end of the converting circuit 260 and the ground and so the load driving modulator 245 adjusts an electronic state of the load 250, such as a voltage of the load, a current of the load. The charge spike protection circuit 255 is coupled between the output capacitance C and a connecting node of the load driving modulator 245 and the load 250 and provides an unidirectional charge release path to the output capacitance C.

The load 250 is an LED module, which comprises at least one LED string. In the present embodiment, there are two LED strings for explanation. A positive end of each LED string is coupled to the output end of the converting circuit 260 to receive an electric power from the driving power source Vout and a negative end thereof is coupled to the load driving modulator 245. In the present embodiment, the load driving modulator 245 regulates a current of each LED string. A lowest voltage selecting circuit is coupled to the negative end of each LED string to select the lowest voltage of the negative end as a voltage feedback signal VFB. The converting controller 200 controls the converting circuit 260 according to the voltage feedback signal VFB to make the lowest voltage keep at a preset voltage so as to drive the LED module in a higher efficiency. Of course, the converting controller 200 alternatively detects any current of the LED string to execute the feedback control to make the current of the LED string keep at a preset current value. The load driving modulator 245 further balances all the LED string(s) at the preset current value.

The load driving modulator 245 can be a current mirror circuit or a circuit capable adjusting an equivalent resistance value thereof by current feedback, and so an amount of the current flowing through the load 250 can be adjusted by the load driving modulator 245. Generally, the load driving modulator 245 has transistors, such as bipolar junction transistor (BJT), MOSFET, in which each transistor has a current control terminal connected to a corresponding LED string. In the following, take the MOSFET for explanation. A first end (drain) of the MOSFET is coupled to a corresponding LED string of the load 250, a second end (source) thereof is grounded, and a control end (gate) receives a control signal for adjusting an amount of the current flowing through the MOSFET.

The charge spike protection circuit 255 comprises two P-N junction diode, in which a positive end of each P-N junction diode is coupled to a corresponding connecting node of the load 250 and the load driving modulator 245, i.e., the current control end, and a negative end thereof is coupled to the output capacitance C of the converting circuit 260 to provide an unidirectional charge release path from the current control end to the output capacitance C. Therefore, while the charge spike with positive voltage produced by the electrostatic energy or other cause(s) is transmitted to the load driving modulator 245 through the current control end, the P-N junction diode of the charge spike protection circuit 255 is turned on to transmit the energy (charge) to the output capacitance C, and so the voltage can be clamped to be slight higher than the driving power source Vout during the charge spike occurring. The capacitance value of the output capacitance C can sustain the charge spike due to that the capacity of the output capacitance C is sufficient for stably providing the output power source Vout. If the charge spike with negative voltage is transmitted to the load driving modulator 245 through the current control end, the P-N junction diode of the charge spike protection circuit 255 is turned off due to being negative biased. A negative end of a parasitic diode Db in the MOSFET is coupled to the current control end and a positive end thereof is coupled to the ground. The parasitic diode Db is turned on because of being forward biased and so the energy of the charge spike is transmitted to the ground to avoid the internal circuit of the load driving modulator 245 being damaged. In addition, the gate of MOSFET has lower voltage withstanding and may be damaged whiling the charge spike flows to the gate. Hence, it can increase diode(s) between the gate and the drain, and/or between the gate and the source as an internal electrostatic discharge protection circuit to bypass charge spike to the current control end or the ground.

An auxiliary charge spike protection circuit 255b is optionally added in the present invention to further strengthen the protection for charge spike. In the embodiment, the auxiliary charge spike protection circuit 255b has a plurality of resistor-capacitor (RC) circuit, each connected between the ground and a corresponding connecting node of the load 250 and the load driving modulator 245. The capacitors of the auxiliary charge spike protection circuit 255b have a smaller capacitance and so do not affect the operation of load driving circuit. While the charge spike is transmitted to the load driving modulator 245 through the current control end, the charge spike protection circuit 255b immediately absorbs the partial energy of the charge spike.

Figure 4:
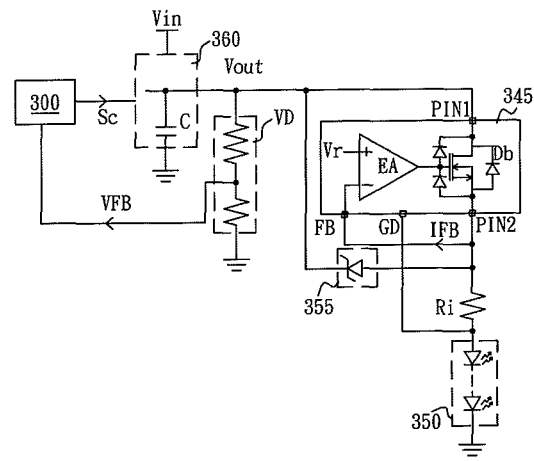
FIG. 4 is a schematic diagram of a load driving circuit with charge spike protection according to a second embodiment of the invention.

FIG. 4 is a schematic diagram of a load driving circuit with charge spike protection according to a second embodiment of the invention. The load driving circuit comprises a converting circuit 360, a converting controller 300, a load driving modulator 345 and a charge spike protection circuit 355. The converting circuit 360 is adapted to be coupled to an input power source Vin and supply a driving power source Vout at an output end to drive a load 350. The converting circuit 360 has an output capacitance C coupled to the output end of the converting circuit 360 to stabilize an outputting of the converting circuit 360. A voltage detecting circuit VD is coupled to the output end of the converting circuit 360 to generate a voltage feedback signal VFB according to the driving power source Vout. The converting controller 300 generates a switch signal Sc responsive to the voltage feedback signal VFB to control an amount of the driving power source Vout. The load driving modulator 345 and the load, connected in series, are coupled between the output end of the converting circuit 360 and the ground and so the load driving modulator 345 adjusts an electronic state of the load 350. The charge spike protection circuit 355 is coupled between the output capacitance C and the connecting node of the load driving modulator 345 and the load 350 and provides an unidirectional charge release path to the output capacitance C.

The load driving modulator 345 may be a conventional linear regulator, such as: low dropout regulator. The load driving modulator 345 detects an amount of a current flowing through the load 350 by a current detecting resistance Ri to accordingly adjust an equivalent resistance value of the MOSFET to for stabilizing the current at a preset current value. The load driving modulator 345 has a first input/output end PIN1, a second input/output end PIN2, a feedback control end FB and a ground end GD. The first input/output end PIN1 is coupled to the output end of the converting circuit 360, and the second input/output end PIN2 is coupled to one end of the current detecting resistance Ri. A positive end of the load 350 is coupled to the other end of the current detecting resistance Ri and a negative end thereof is coupled to the ground. The charge spike protection circuit 355 comprises a zener diode, in which a negative end thereof is coupled to the output capacitance C and a positive end thereof is coupled to the second input/output end PIN2. The linear regulator comprises an error amplifier, which receives the current detecting signal IFB by the feedback control end FB and adjusts the equivalent resistance value of the MOSFET according to the feedback control end FB to stabilize the current.

While the charge spike with positive voltage produced by the electrostatic or other cause(s) is transmitted to the load driving modulator 345 through the ground GD or the feedback control end FB of the load driving modulator 345, the parasitic diode Db of the MOSFET is turned on to transmit the energy of the charge spike to the output capacitance C. When the charge spike with negative end is transmitted to the load driving modulator 345 through the ground GD or the feedback control end FB, the zener diode of the charge spike protection circuit 355 is turned on due to a voltage of charge spike exceeding a breakdown voltage of the zener diode and the energy of the charge spike can be transmitted to the output capacitance C. The breakdown voltage of the zener diode can be determined according to a lighting threshold voltage of the LED module of the load 350 to avoid influencing for driving circuit in the normal operating of the load 350.

As mentioned above in the present embodiments, no matter the load driving modulator connected with the ground or the output power source, the connecting node of the load and the load driving modulator can be coupled to the output capacitance of the converting circuit by the diode to provide an unidirectional charge release path. The parasitic diode of the MOSFET is also used to provide another charge release path in the present invention. Compared with the transient voltage suppressor, the P-N junction diode and the zener diode have a feature of more accurate voltage clamping for clamping a voltage of the charge spike and further avoid shortening the life spin of the load driving modulator. Moreover, the response of the P-N junction diode is faster than the transient voltage suppressor for providing a faster protection. Besides, the cost of the P-N junction diode is much cheaper than that of the transient voltage suppressor.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A load driving circuit with charge spike protection, comprising:
   a converting circuit, adapted to be coupled to an input power source and supply a driving power source at an output end to drive a load, wherein the converting circuit has an output capacitance coupled to the output end thereof;
   a converting controller, controlling an amount of the driving power source responsive to a current or a voltage of the load;
   a load driving modulator, coupled to the output end of the converting circuit by being connected in series with the load, and adjusting an electronic state of the load;
   a charge spike protection circuit, coupled to the output capacitance and at least one connecting node of the load and the load driving modulator to provide an unidirectional charge release path to the output capacitance; and
   an auxiliary charge spike protection circuit having a plurality of RC circuits, wherein each RC circuit is connected to a corresponding connecting node of the load and the load driving modulator.

2. The load driving circuit with charge spike protection according to claim 1, wherein the load driving modulator is a linear regulator, having a first input/output end, a second input/output end and a feedback control end, in which one of the first input/output end and the second input/output end is coupled to the load, the feedback control end receives a current detecting signal responsive to the current of the load and the linear regulator stabilizes the current of the load stable according to the current detecting signal.

3. The load driving circuit with charge spike protection according to claim 1, wherein the load driving modulator comprises at least one transistor to adjust the amount of the current of the load; each transistor has a parasitic diode, a negative end of the parasitic diode is couple with a connecting node of the load driving modulator and the load and a positive end of the parasitic diode is couple to the ground.

4. A load driving circuit with charge spike protection, comprising:
   a converting circuit, adapted to be coupled to an input power source and supply a driving power source at an output end to drive a load, wherein the converting circuit has an output capacitance coupled to the output end thereof and the load is an LED module;
   a converting controller, controlling an amount of the driving power source responsive to a current or a voltage of the load;

a load driving modulator, coupled to the output end of the converting circuit by being connected in series with the load, and adjusting an electronic state of the load; wherein the load driving modulator comprises at least one transistor to adjust the amount of the current of the load;

a charge spike protection circuit, coupled to the output capacitance and at least one connecting node of the load and the load driving modulator to provide an unidirectional charge release path to the output capacitance; and an auxiliary charge spike protection circuit having a plurality of RC circuits, wherein each RC circuit is connected to a corresponding connecting node of the load and the load driving modulator.

5. The load driving circuit with charge spike protection according to claim 4, wherein the least one transistor is a MOSFET having a first end, a second end and a control end, in which there are electrostatic discharge protection circuits between the first end and the control end and between the second end and the control end.

6. The load driving circuit with charge spike protection according to claim 4, wherein the load driving modulator is a linear regulator, having a first input/output end, a second input/output end and a feedback control end, in which one of the first input/output end and the second input/output end is coupled to the load, the feedback control end receives a current detecting signal responsive to the current of the load and the linear regulator stabilizes the current of the load stable according to the current detecting signal.

* * * * *